(12) United States Patent
Rabe et al.

(10) Patent No.: US 9,685,000 B1
(45) Date of Patent: Jun. 20, 2017

(54) USING AUGMENTED REALITY IN DATA STORAGE MANAGEMENT

(75) Inventors: Bruce R. Rabe, Dedham, MA (US); Scott E. Joyce, Foxborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 681 days.

(21) Appl. No.: 13/247,205

(22) Filed: Sep. 28, 2011

(51) Int. Cl.
G09G 5/00 (2006.01)
G06T 19/00 (2011.01)

(52) U.S. Cl.
CPC .................................. *G06T 19/006* (2013.01)

(58) Field of Classification Search
None
See application file for complete search history.

(56) References Cited

U.S. PATENT DOCUMENTS

| 8,386,593 | B1* | 2/2013 | Gao ...................... H04L 41/085 709/223 |
| 8,743,145 | B1* | 6/2014 | Price ............................ 345/633 |
| 9,058,764 | B1* | 6/2015 | Persson ..................... G09G 5/14 |
| 2010/0049494 | A1* | 2/2010 | Radibratovic ......... G06Q 10/04 703/13 |
| 2011/0173576 | A1* | 7/2011 | Murphy et al. ............... 715/863 |
| 2012/0200743 | A1* | 8/2012 | Blanchflower ...... H04N 21/254 348/239 |
| 2012/0320046 | A1* | 12/2012 | Ihara et al. .................... 345/419 |
| 2013/0031202 | A1* | 1/2013 | Mick et al. .................... 709/217 |
| 2013/0120449 | A1* | 5/2013 | Ihara .................... G06F 11/0727 345/633 |
| 2013/0169684 | A1* | 7/2013 | Deffeyes et al. ............. 345/633 |

FOREIGN PATENT DOCUMENTS

KR   1020110029484   *  3/2011

OTHER PUBLICATIONS

Ke, "An Augmented Reality-Based Application for Equipment Maintenance", 2005, URL: http://link.springer.com/chapter/10.1007%2F11573548_107.*
Sanziro, "Use Camera app's tap to focus feature to adjust exposure", Jan. 2011, URL: http://sanziro.com/2011/01/use-camera-apps-tap-to-focus-feature-to-adjust-exposure.html.*

* cited by examiner

*Primary Examiner* — David H Chu
(74) *Attorney, Agent, or Firm* — Krishnendu Gupta; Jason A. Reyes

(57) ABSTRACT

A method is used in using augmented reality in data storage management. An original image of data center equipment is received. Based on the original image, the data center equipment is automatically identified. Based on the identification, management/status information about the data center equipment is automatically retrieved. An augmented reality image is derived from the original image and the management/status information.

12 Claims, 8 Drawing Sheets

USING AUGMENTED REALITY IN DATA STORAGE MANAGEMENT

BACKGROUND

Technical Field

This application relates to using augmented reality in data storage management.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used. In a common implementation, a Storage Area Network (SAN) is used to connect computing devices with a large number of storage devices. Management and modeling programs may be used to manage these complex computing environments, which may be, include, or be included in a data center.

A data center refers to processing functionality for performing one or more prescribed processing tasks. In one common application, for example, a provider may use a data center to implement any kind of network-accessible service (such as an Email service, search service, and so on). In some cases, the provider may use a specially designed computer room within a general purpose facility to implement the data center. For a particularly large-scale service, the provider may devote one or more separate facilities to implement the data center.

Recent developments in integration technology have opened the way for the spread of various portable devices such as mobile phones and portable game players.

In particular, mobile phones are no longer only tools for telecommunications but are also tools for providing a variety of functions such as a digital camera function.

Virtual reality is one of the relatively new information technology paradigms that can allow people to experience various situations that they will never experience in real life due to some spatial and physical restrictions, by creating a computer-based artificial environment that interactively responds to the human sensory system.

Augmented reality, which is the term derived from terminology regarding virtual environment and virtual reality, is a field of computer research which deals with the combination of real-world images and virtual-world images such as computer graphic images. Real world information may include information that is not necessarily needed by users or may lack information that is needed by users. In a virtual environment created by a computer, such unnecessary information can be simplified or can be made invisible, and information can be added. In other words, augmented reality systems combine a real environment with virtual objects, thereby effectively interacting with users in real time.

Augmented reality has been widely used in various fields of application such as the entertainment field and the newscast field. We often see TV weather broadcasts where the forecaster appears in front of a weather chart that keeps changing naturally. In reality, the forecaster stands in front of a blue screen, and a virtual studio environment is established based on computer-generated virtual images, thereby realizing augmented reality.

SUMMARY OF THE INVENTION

A method is used in using augmented reality in data storage management. An original image of data center equipment is received. Based on the original image, the data center equipment is automatically identified. Based on the identification, management/status information about the data center equipment is automatically retrieved. An augmented reality image is derived from the original image and the management/status information.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Described below is a technique for use in using augmented reality in data storage management which technique may be used to help provide, among other things, augmented reality for storage management. In at least one implementation in accordance with the technique, a user can point a smartphone with a camera at a data storage system and overlay virtual displays of, for example, power consumption, temperature, hardware faults, IOPs, CPU utilization, remaining capacity, or a pie chart breaking down storage utilization by application, or the flow of data from a host to the storage system. In at least some implementations, distinguishing among storage systems in a large data center is aided by use of an RFID transmitter, bar code, or label on each storage system, or blinking lights on in a respective pattern on each storage system.

Conventionally, monitoring information about storage systems is provided via traditional desktop graphical user interfaces (GUIs) that are distant from the storage systems themselves. By contrast, at least some implementations in accordance with the technique allow the user to interact in close proximity to the systems which provides more intimate feedback and helps the user make intelligent management decisions.

Figure 1:
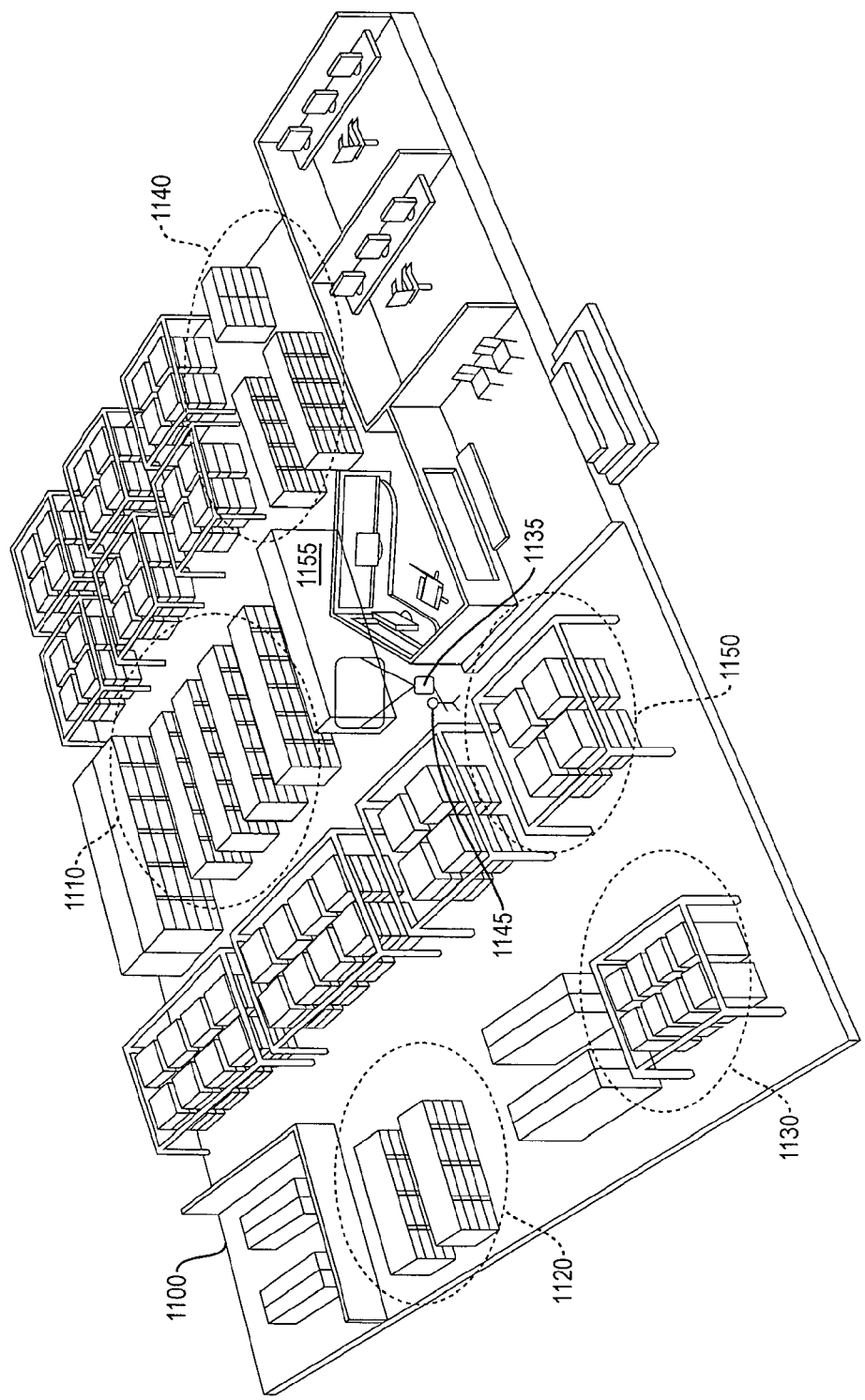
FIG. 1 illustrates an example of a data center that may be used with the technique described herein.

Referring now to FIG. 1, shown is an example of an embodiment of a computer system that may be used in connection with performing the technique or techniques described herein. Data center 1100 includes zones 1110, 1120, 1130, 1140, and 1150, wherein each zone may represent a grouping of storage component and/or a different type of data storage or processing. For example, zone 1110 may represent data processing or servers for virtual machines while zone 1150 may represent storage systems of database information.

As described in more detail below, in accordance with the technique described herein, user 1145 uses a portable computing device 1135 having a camera and a display to capture one or more still or video images of equipment 1155 of data center 1100, for use in augmented reality processing as described herein.

Device 1135 may include a mobile phone, a smart phone, a laptop computer, a digital broadcast terminal, a personal digital assistant (PDA), a portable multimedia player (PMP), a navigation system and/or the like. The technique described herein may also be applicable to other apparatus, such a stationary terminal as a digital TV, a desktop computer and/or the like.

Figure 2:
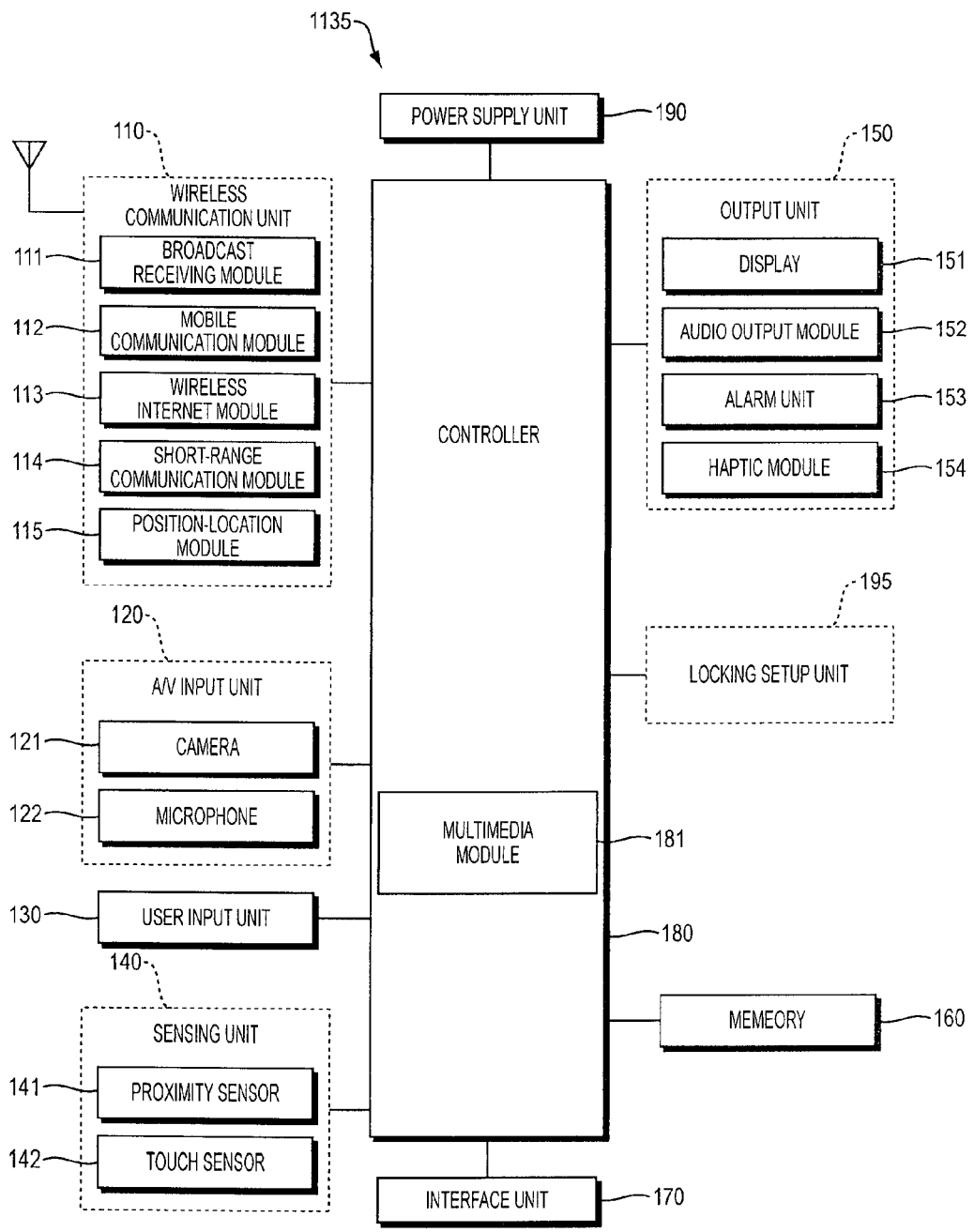
FIGS. 2, 7 are block diagrams of an example device and system that may be used with the technique described herein.

FIG. 2 is a block diagram of device 1135 according to one example embodiment. Other embodiments, arrangements and configurations may also be provided.

As shown in FIG. 2, device 1135 may include a wireless communication unit 110, an A/V (audio/video) input unit 120, a user input unit 130, a sensing unit 140, an output unit 150 having a display 151, a memory 160, an interface unit 170, a controller 180, a power supply unit 190, a locking set-up unit 195 and the like. FIG. 2 shows device 1135 having various components, although all the illustrated components are not a requirement. Greater or fewer components may alternatively be implemented.

Wireless communication unit 110 may include one or more components that permit wireless communication between the device 1135 and a wireless communication system or network within which device 1135 is located. For example, the wireless communication unit 110 may include a broadcast receiving module 111, a mobile communication module 112, a wireless Internet module 113, a short-range communication module 114, a position-location module 115 and/or the like. The broadcast receiving module 111 may receive a broadcast signal and/or broadcast associated information from an external broadcast managing server via a broadcast channel, and the broadcast signal and/or broadcast associated information received by the broadcast receiving module 111 may be stored in a suitable device, such as the memory 160.

The mobile communication module 112 transmits/receives wireless signals to/from one or more network entities (e.g., base station, external terminal, server, etc.). Such wireless signals may represent audio, video, and data signals according to text/multimedia message transceivings, among others.

The wireless Internet module 113 supports Internet access for the device 1135. This module may be internally or externally coupled to the device 1135. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 may facilitate relatively short-range communications. Suitable technologies for implementing this module include radio frequency identification (RFID), infrared data association (IrDA), ultra-wideband (UWB), as well as the networking technologies commonly referred to as Bluetooth and ZigBee, to name a few.

The position-location module 115 may identify or otherwise obtain the location or position of the device 1135. This module may be implemented with a global positioning system (GPS) module.

The audio/video (A/V) input unit 120 may provide audio or video signal inputs to the device 1135. The A/V input unit 120 may include a camera 121 and a microphone 122. The camera 121 may receive and process image frames of still pictures or video that are obtained by an image sensor in a video call mode or a photographing mode. The processed image frames may be displayed on the display 151.

The image frames processed by the camera 121 may be stored in the memory 160 or may be externally transmitted via the wireless communication unit 110. At least two cameras 121 may be provided to the device 1135 based on environment of usage.

The microphone 122 may receive an external audio signal while the device 1135 is in a particular mode, such as phone call mode, a recording mode and/or a voice recognition mode. The audio signal may be processed and converted into electric audio data. The processed audio data may be transformed into a format transmittable to a mobile communication base station via the mobile communication module 112 in case of a call mode. The microphone 122 may include noise removing algorithms (or noise canceling algorithms) to remove or reduce noise generated in the course of receiving the external audio signal.

The user input unit 130 may generate input data responsive to user manipulation of an associated input device or devices. Examples of such devices may include a keypad, a dome switch, a touchpad (e.g., static pressure/capacitance), a jog wheel, a jog switch, etc.

The sensing unit 140 may provide sensing signals for controlling operations of the device 1135 using status measurements of various aspects of the device 1135. For example, the sensing unit 140 may detect an open/close status of the device 1135, relative positioning of components (e.g., a display and a keypad) of the device 1135, a position change of the device 1135 or a component of the device 1135, a presence or an absence of user contact with the device 1135, orientation or acceleration/deceleration of the device 1135. As an example, the device 1135 may be configured as a slide-type mobile terminal. The sensing unit 140 may sense whether a sliding portion of the device 1135 is open or closed. Other examples include the sensing unit 140 sensing presence or absence of power provided by the power supply 190, presence or absence of a coupling or other connection between the interface unit 170 and an external device. The sensing unit 140 may include a proximity sensor 141 and a touch sensor 142.

The output unit 150 may generate outputs relevant to senses of sight, hearing, touch and the like. The output unit

150 may include the display 151, an audio output module 152, an alarm 153 and a haptic module 154.

The display 151 may visually display (i.e., output) information associated with the device 1135. For example, if the device 1135 is operated in a phone call mode, the display 151 may provide a user interface (UI) or a graphical user interface (GUI) that includes information associated with placing, conducting, and/or terminating a phone call. If the device 1135 is in a video call mode or a photographing mode, the display 151 may additionally or alternatively display images that are associated with these modes, the UI or the GUI.

The display 151 may be implemented using known display technologies including, for example, a liquid crystal display (LCD), a thin film transistor-liquid crystal display (TFT-LCD), an organic light-emitting diode display (OLED), a flexible display and a three-dimensional (3-D) display. The device 1135 may include one or more of such displays.

Some of the displays may be implemented in a transparent or optical transmittive type that can be called a transparent display. A transparent OLED (or TOLED) may be an example of the transparent display. The display 151 may also be implemented as the optical transmittive type. In this configuration, a user may see an object in rear of a terminal body via an area occupied by the display 151 of the terminal body.

At least two displays 151 may be provided on the device 1135 based on the configuration of the device 1135. For example, a plurality of displays may be arranged on a single face of the device 1135 by being spaced apart from each other or by being built in one body. A plurality of displays may be arranged on different faces of the device 1135.

In a case that the display 151 and the touch sensor 141 for detecting a touch action are configured in a mutual layer structure (hereafter called a touch screen), the display 151 may be used as an input device as well as an output device. The touch sensor 142 may be configured as a touch film, a touch sheet, a touchpad and/or the like.

The touch sensor 142 may convert a pressure applied to a specific portion of the display 151 or a variation of a capacitance generated from a specific portion of the display 151 to an electric input signal. The touch sensor 142 may detect a pressure of a touch as well as a touched position or size. A separate pressure sensor may detect pressure of the touch.

If a touch input is provided to the touch sensor 142, signal(s) corresponding to the touch may be transferred to a touch controller. The touch controller may process the signal(s) and then transfer the processed signal(s) to the controller 180. The controller 180 may determine whether a prescribed portion of the display 151 is touched.

The proximity sensor 141 may be provided to an internal area of the device 1135 enclosed by the touch screen and/or around the touch screen. The proximity sensor 141 may detect a presence or non-presence of an object approaching a prescribed detecting surface or an object existing around the proximity sensor 141 using an electromagnetic field strength or infrared ray without mechanical contact. The proximity sensor 141 may have longer durability than a contact type sensor and may also have a wider utility than the contact type sensor.

The proximity sensor 141 may include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. If the touch screen includes the electrostatic capacity proximity sensor, the proximity of a pointer may be detected using a variation of electric field according to proximity of the pointer. The touch screen (i.e., touch sensor) may be classified as the proximity sensor 141.

In the following description, an action that a pointer approaches without contacting the touch screen may be called a proximity touch. An action that a pointer actually touches the touch screen may be called a contact touch. The meaning of the position on the touch screen proximity-touched by the pointer may define a position of the pointer that vertically opposes the touch screen when the pointer performs the proximity touch.

The proximity sensor 141 may detect a proximity touch and a proximity touch pattern (e.g., a proximity touch distance, a proximity touch duration, a proximity touch position, a proximity touch shift state, etc.). Information corresponding to the detected proximity touch action and the detected proximity touch pattern may be outputted to the touch screen.

The audio output module 152 may function in various modes including a call-receiving mode, a call-placing mode, a recording mode, a voice recognition mode, a broadcast reception mode and/or the like to output audio data that is received from the wireless communication unit 110 or is stored in the memory 160. During operation, the audio output module 152 may output an audio signal relating to a particular function (e.g., a call received, a message received, etc.). The audio output module 152 may be implemented using one or more speakers, buzzers, other audio producing devices, and/or combinations thereof.

The alarm 153 may output a signal for announcing an occurrence of a particular event associated with the device 1135. Events may include a call received event, a message received event and a touch input received event. The alarm 153 may output a signal for announcing the event occurrence by way of vibration as well as video or audio signal. The video or audio signal may be outputted via the display 151 or the audio output unit 152. The display 151 or the audio output module 152 may be regarded as a part of the alarm 153.

The haptic module 154 may generate various tactile effects that can be sensed by a user. Vibration may be a representative one of the tactile effects generated by the haptic module 154. Strength and pattern of the vibration generated by the haptic module 154 may be controllable. For example, different vibrations may be outputted by being combined (or synthesized) together or may be outputted in sequence.

The haptic module 154 may generate various tactile effects as well as vibrations. For example, the haptic module 154 may generate an effect attributed to the arrangement of pins vertically moving against a contact skin surface, an effect attributed to injection/suction power of air through an injection/suction hole, an effect attributed to a skim over a skin surface, an effect attributed to a contact with an electrode, an effect attributed to an electrostatic force, an effect attributed to representation of warm/cold sense using an endothermic or exothermic device and/or the like.

The haptic module 154 may enable a user to sense a tactile effect through a muscle sense of a finger, an arm or the like as well as to transfer the tactile effect through a direct contact. At least two haptic modules 154 may be provided on the device 1135 based on a corresponding configuration type of the device 1135.

The memory 160 may store programs for operating the controller 180. The memory 160 may temporarily store input/output data such as phonebook data, message data, still image, and/or moving image. Data for various patterns of vibration and/or sound outputted in case of a touch input to the touch screen may be stored in the memory 160.

The memory 160 may be implemented using any type or combination of suitable volatile and non-volatile memories or storage devices including a hard disk, a random access memory (RAM), a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk, a multimedia card micro type memory, a card-type memory (e.g., SD memory, XD memory, etc.) and/or other similar memory or data storage device. The device 1135 may operate in association with a web storage for performing a storage function of the memory 160 on the Internet.

The interface unit 170 may couple the device 1135 with external devices. The interface unit 170 may receive data from the external devices or may be supplied with power and then transfer the data or power to respective elements of the device 1135 or enable data within the device 1135 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module may be a chip for storing various kinds of information for authenticating a use authority of the device 1135 and may include a User Identify Module (UIM), a Subscriber Identify Module (SIM), a Universal Subscriber Identity Module (USIM) and/or the like. A device having an identity module (hereafter called an identity device) may be manufactured as a smart card. The identity device may be connectible to the device 1135 via a relevant port.

When device 1135 is connected to an external cradle, the interface unit 170 may become a passage for supplying the device 1135 with power from the cradle or a passage for delivering various command signals inputted from the cradle by a user to the device 1135. Each of the various command signals inputted from the cradle or the power may operate as a signal enabling the device 1135 to recognize if it is correctly loaded in the cradle.

The controller 180 may control overall operations of the device 1135. For example, the controller 180 may perform control and processing associated with voice calls, data communications, video calls, etc. The controller 180 may include a multimedia module 181 that provides multimedia playback. The multimedia module 181 may be configured as part of the controller 180, or may be implemented as a separate component. The controller 180 may have a time counting function.

The controller 180 may perform a pattern recognizing process for recognizing a writing input or a picture drawing input carried out on the touch screen as characters or images, respectively.

The power supply unit 190 may provide a power required by various components of the device 1135. The power may be internal power, external power, and/or a combination thereof.

Embodiments may be implemented in a computer-readable medium using, for example, computer software, hardware, and/or some combination thereof. For hardware implementation, embodiments may be implemented using one or more applications of specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform functions described herein, and/or a selective combination thereof. Embodiments may also be implemented by the controller 180.

For software implementation, embodiments may be implemented with separate software modules, such as procedures and functions, each of which may perform one or more of the functions and operations described herein. The software codes may be implemented with a software application written in any suitable programming language and may be stored in the memory 160, and executed by a controller or a processor, such as the controller 180.

Figure 3A:
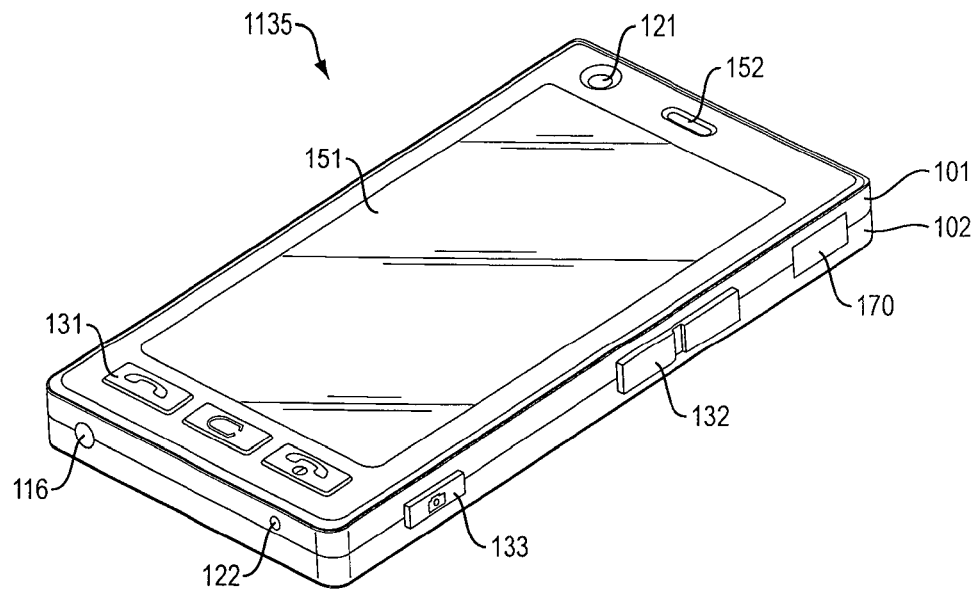
FIG. 3A is a perspective diagram of a front of the example device of FIG. 2.

FIG. 3A is a front view of device 1135 according to an example embodiment. Other embodiments, arrangements and configurations may also be provided.

As shown in FIG. 3A, the device 1135 may have a bar type terminal body. Embodiments of device 1135 may be implemented in a variety of other configurations. Examples of such configurations may include a folder-type, a slide-type, a bar-type, a rotational-type, a swing-type and/or combinations thereof.

The body may include a case (e.g., a casing, a housing, a cover) that form an exterior of the device. The case may be divided into a front case 101 and a rear case 102. Various electric/electronic parts may be provided in a space between the front case 101 and the rear case 102.

The display 151, the audio output unit 152, the camera 121, the user input unit 130 (including first and second manipulation units 131, 132), the microphone 122, the interface unit 170 and the like may be provided on the device body, and more particularly may be provided on the front case 101.

The display 151 may occupy most of a main face of the front case 101. The audio output module 152 and the camera 121 may be provided at an area adjacent to one end portion of the display 151, while the first manipulation unit 131 and the microphone 122 may be provided at another area adjacent to the other end portion of the display 151. The second manipulation unit 132 and the interface unit 170 may be provided on lateral sides of the front and rear cases 101 and 102.

The user input unit 130 may receive a command for controlling an operation of the device 1135. The user input unit 130 may include the first and second manipulating units 131 and 132. The first and second manipulating units 131 and 132 may be called a manipulating portion and may adopt any mechanism of a tactile manner that enables a user to perform a manipulation action by experiencing a tactile feeling.

Content inputted by the first manipulating unit 131 or the second manipulating unit 132 may be diversely set. For example, a command such as a start, an end, a scroll and/or the like may be inputted to the first manipulating unit 131. A command for a volume adjustment of sound outputted from the audio output unit 152, a command for a switching to a touch recognizing mode of the display 151 and/or the like may be inputted to the second manipulating unit 132.

Figure 3B:
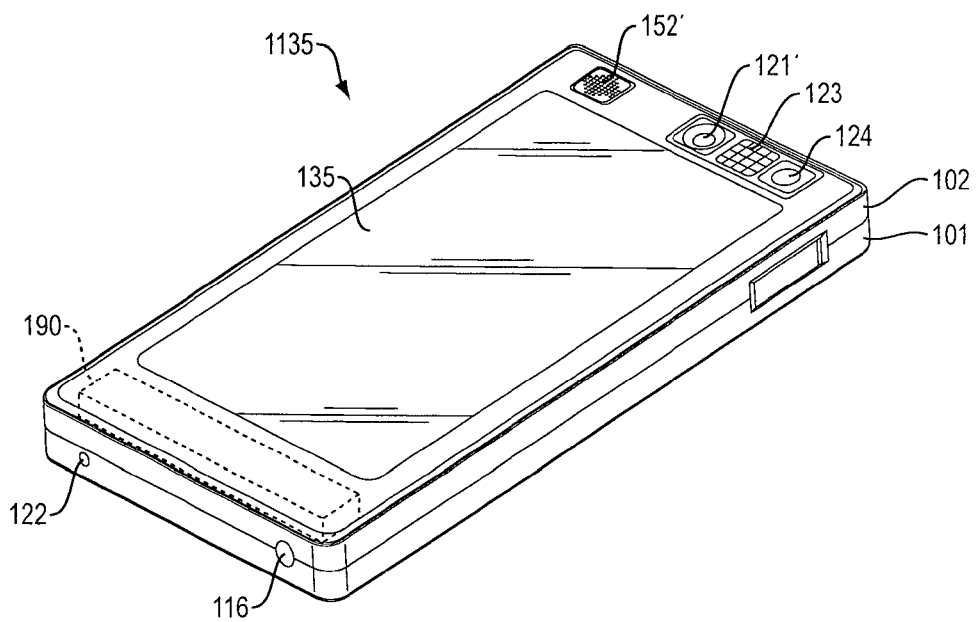
FIG. 3B is a perspective diagram of a backside of the example device of FIG. 2.

FIG. 3B is a perspective diagram of a backside of the device shown in FIG. 3A. Other embodiments, arrangements and configurations may also be provided.

As shown in FIG. 3B, a camera 121' may be additionally provided on a backside of the device body, and more particularly on the rear case 102. The camera 121' may have a photographing direction that is substantially opposite to a photographing direction of the camera 121 and may have pixels differing from pixels of the camera 121.

For example, the camera 121 may have a lower number of pixels to capture and transmit a picture of a user face for a video call, while the camera 121' may have a greater number of pixels for capturing a general subject for photography without transmitting the captured subject. Each of the cameras 121 and 121' may be provided on the device body to be rotated and/or popped up.

A flash 123 and a mirror 124 may be additionally provided adjacent to the camera 121'. The flash 123 may project light toward a subject in case of photographing the subject using the camera 121'. If a user attempts to take a picture of the user (i.e., self-photography) using the camera 121', the mirror 124 may enable the user to view a user face reflected by the mirror 124.

An additional audio output unit 152' may be provided on a backside of the device body. The additional audio output unit 152' may implement a stereo function together with the audio output unit 152 and may be used for implementation of a speakerphone mode in talking over the device 1135.

A broadcast signal receiving antenna 124 may be additionally provided at the lateral side of the device body as well as an antenna for communication or the like. The antenna 124 may be considered as a portion of the broadcast receiving module 111 and/or may be retractably provided on the device body.

The power supply unit 190 for supplying a power to the device 1135 may be provided with respect to the device body. The power supply unit 190 may be built within the device body. Alternatively, the power supply unit 190 may be detachably connected to the device body.

FIG. 3B also shows a touchpad 135 for detecting a touch that is additionally provided on the rear case 102. The touchpad 135 may be configured as a light transmittive type. If the display 151 outputs visual information from both faces, the display 151 may also recognize visual information via the touchpad 135. The information outputted from both of the faces may be controlled by the touchpad 135. Alternatively, a display may be further provided to the touchpad 135 so that a touchscreen may also be provided on the rear case 102.

The touchpad 135 may be activated by interconnecting with the display 151 of the front case 101. The touchpad 135 may be provided in rear of the display 151 and in parallel to one another. The touchpad 135 may have a size equal to or less than a size of the display 151.

An augmented reality program as described herein may be distinguished from a virtual reality program in that additional information is shown together with the real world. The augmented reality program may mean a program related to the augmented real world. The following description may relate to obtaining information for use with a data storage system or other equipment of a data center.

With respect to operation in a data center, in general, a user may use camera 121 in an augmented reality process involving equipment 1155. For example, a product name or other identification of equipment 1155 may be obtained from an image received from the camera 121. For example, the memory 160 may store shape information of characteristic external shapes of various data center equipment, and the controller 180 may obtain the product name of the equipment 1155 that is included in the image obtained from the camera 121 by using the shape information. Alternatively, a serial number or a bar code included in the image, or other mechanisms described below, may be used for identifying the equipment 1155.

If the controller 180 determines that the memory 160 does not have identifying information on the equipment 1155 (i.e., the information does not exist in the memory 160), the controller 180 may activate a module within the wireless communication unit 110 to obtain the product name or other identification from an external server such as an Internet server. The information may be obtained through a wireless connection. Further information on the equipment 1155 may then be obtained by using the product name. Such information may be previously stored in the memory 160 and/or may be downloaded through the Internet by activating a module within the wireless communication unit 110 and/or by using the obtained product name. Such information may then be manually stored in an external storage medium such as a desk-top computer and/or a personal computer.

An augmented reality program stored in the memory 160 may be driven to display enhanced information about equipment 1155 on or within the image where the equipment 1155 is displayed. If a user gesture corresponding to such display is detected, additional or different information may be displayed on the image of the equipment 1155. The user gesture may be a real gesture detected by the camera 121, a touch on a specific position of the touch screen, a specific voice signal that is previously set up, or a change of the camera's focus to the specific position. Other gesture mechanisms may be described below.

If the user needs more information, the user may generate a selection signal, e.g., by selecting a dedicated key. The selection signal may be generated from the menu in a state that the augmented real image on the manual is displayed. If the selection signal is for connecting to another resource, a phone number related to the equipment 1155 may be automatically obtained by the controller 180. The phone number may be a phone number of the product company or may be a phone number of aftersales service (AS) center. If this phone number is stored in the memory 160, the controller 180 may search the memory 160 to obtain the phone number. If the phone number is not stored in the memory 160 (i.e., does not exist in the memory 160), the controller 180 may activate the wireless communication unit 110 to obtain the phone number through the Internet. The controller 180 may transmit a call signal to the phone number for a voice call, a video call, and/or a short message.

Figure 4A:
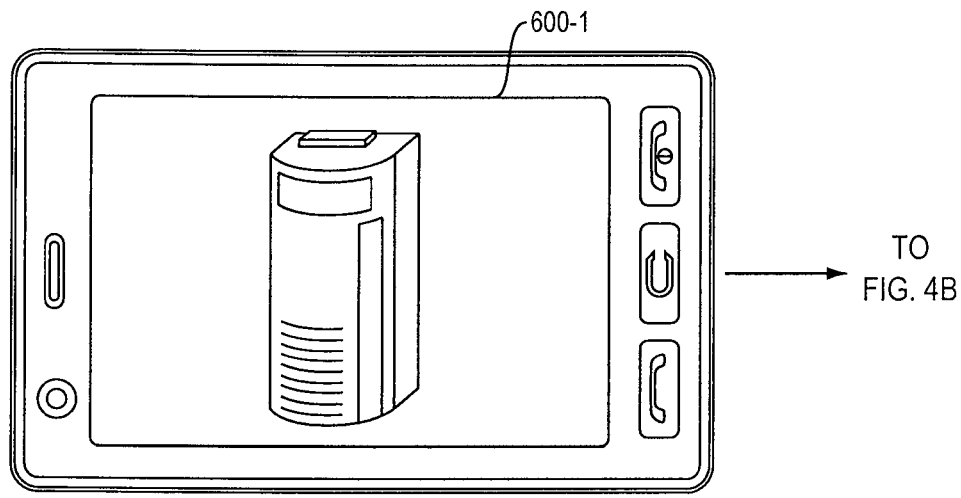
FIGS. 4A, 4B, 5A, 5B, 5C, 6A, 6B are views of displays of the example device of FIG. 2.
Figure 4B:
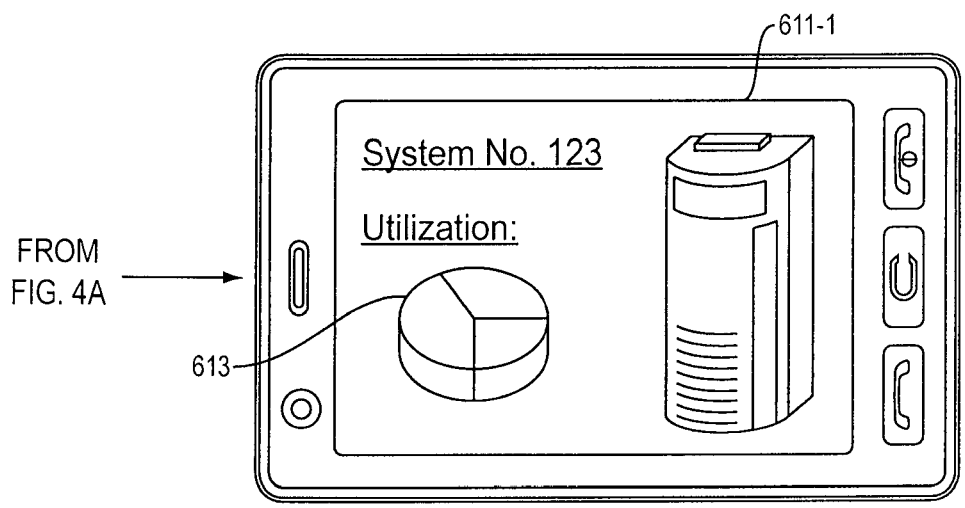

FIG. 4 is an image diagram for explaining a method for displaying according to a first example embodiment. FIG. 4A shows an image 600-1 displayed on display 151 and/or touchpad 135. The image may be considered a captured image of at least a portion of equipment 1155. The controller 180 may use information on a shape or a characteristic portion of various data center equipment that are stored in the memory 160 to obtain a product name or other identification of the equipment 1155. FIG. 4B illustrates that a new, augmented reality image 611-1 may be derived as described below from image 600-1 and the identification of the equipment 1155, to display, for example, a utilization pie chart 613 showing how use of data storage of equipment 1155 is divided up among applications or servers.

Figure 5A:
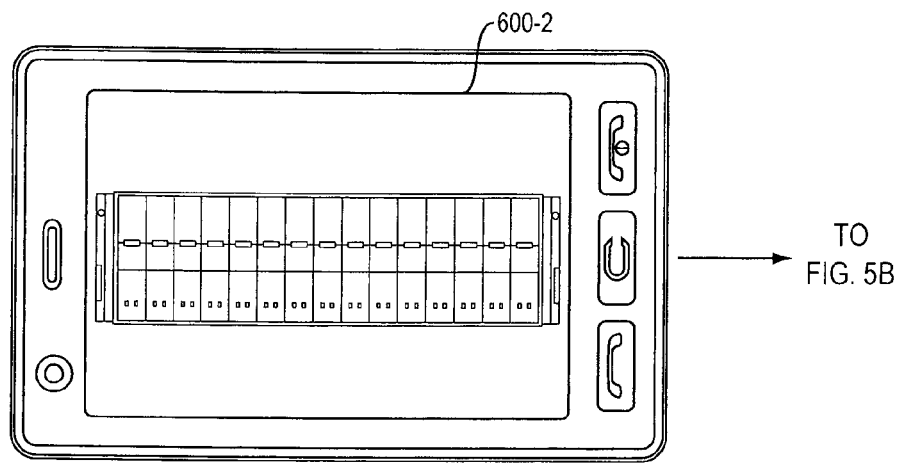
Figure 5B:
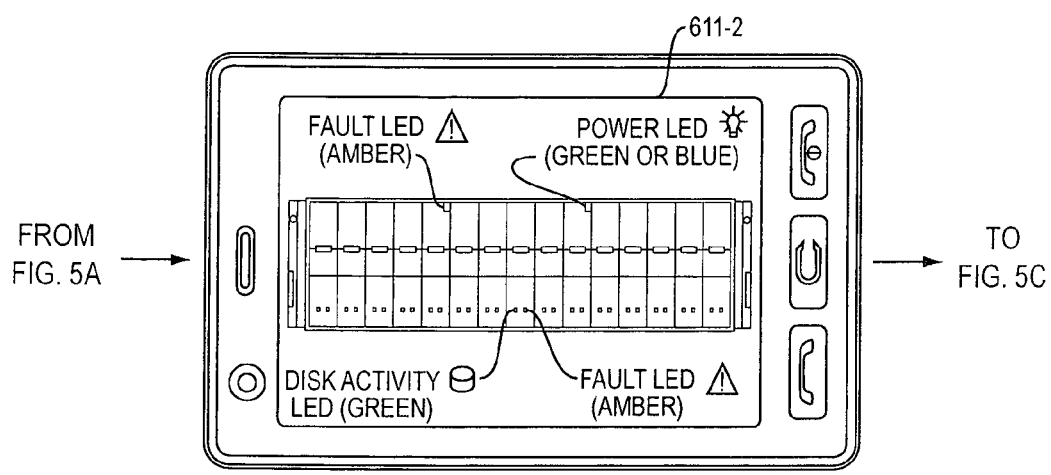
Figure 5C:
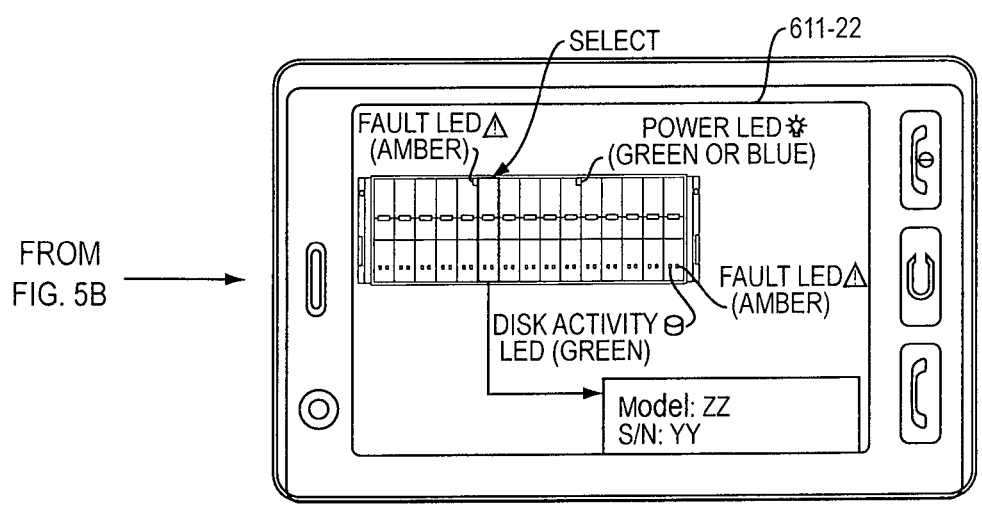

FIG. 5 is an image diagram for explaining a method for displaying according to a second example embodiment. FIG. 5A shows an image 600-2 displayed on display 151 and/or touchpad 135. The image may be considered a captured image of at least a portion of equipment 1155. The controller 180 may use information on a shape or a characteristic portion of various data center equipment that are stored in the memory 160 to obtain a product name or other identification of the equipment 1155. FIG. 5B illustrates that a new, augmented reality image 611-2 may be derived as described below from image 600-2 and the identification of the equipment 1155, to display, for example, labels and pointers indicating functions of LED indicators of equipment 1155. FIG. 5C illustrates that if the user selects an area of image 611-2 (e.g., by use of the touch screen), another augmented reality image 611-22 may be produced to display a model number and serial number of equipment 1155 and/or a portion of equipment 1155 corresponding to the area selected.

Figure 6A:
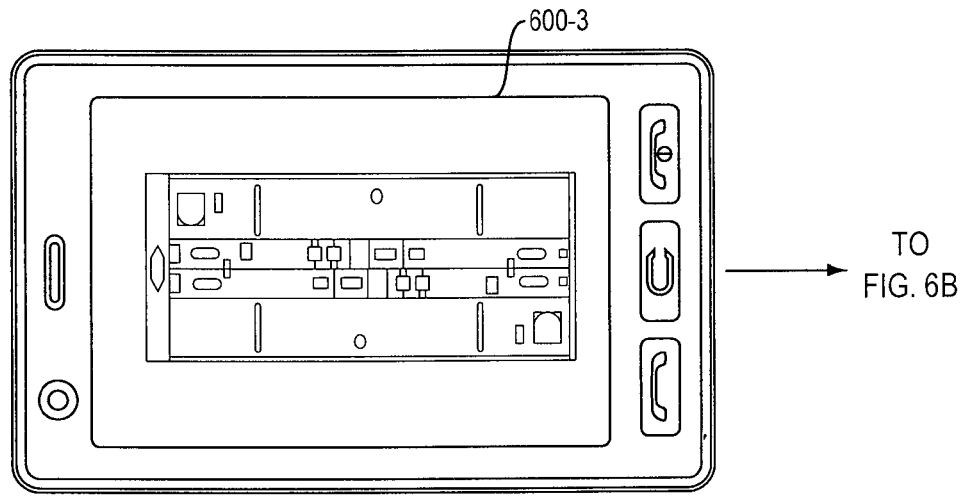
Figure 6B:
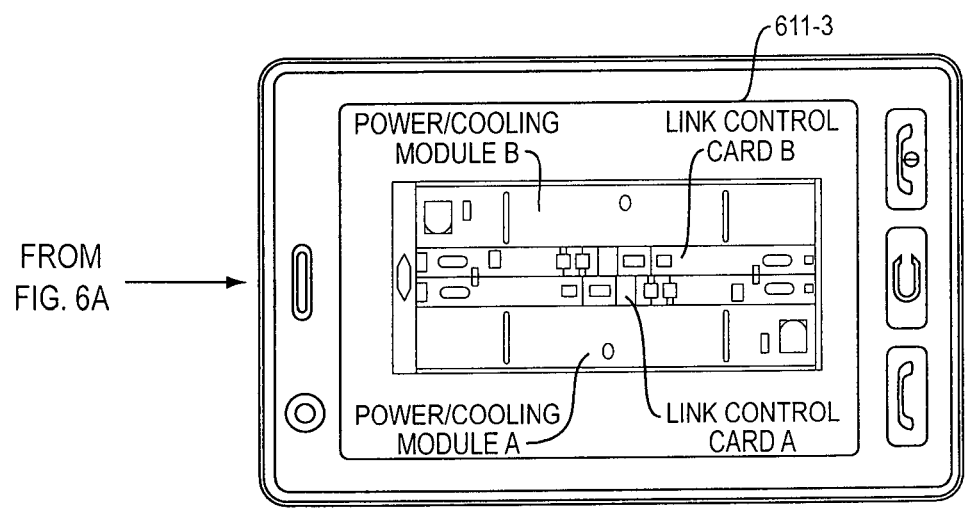

FIG. 6 is an image diagram for explaining a method for displaying according to a third example embodiment. FIG. 6A shows an image 600-3 displayed on display 151 and/or touchpad 135. The image may be considered a captured image of at least a portion of equipment 1155. The controller 180 may use information on a shape or a characteristic portion of various data center equipment that are stored in the memory 160 to obtain a product name or other identification of the equipment 1155. FIG. 6B illustrates that a new, augmented reality image 611-3 may be derived as described below from image 600-3 and the identification of the equipment 1155, to display, for example, labels and pointers identifying components of equipment 1155.

Figure 7:
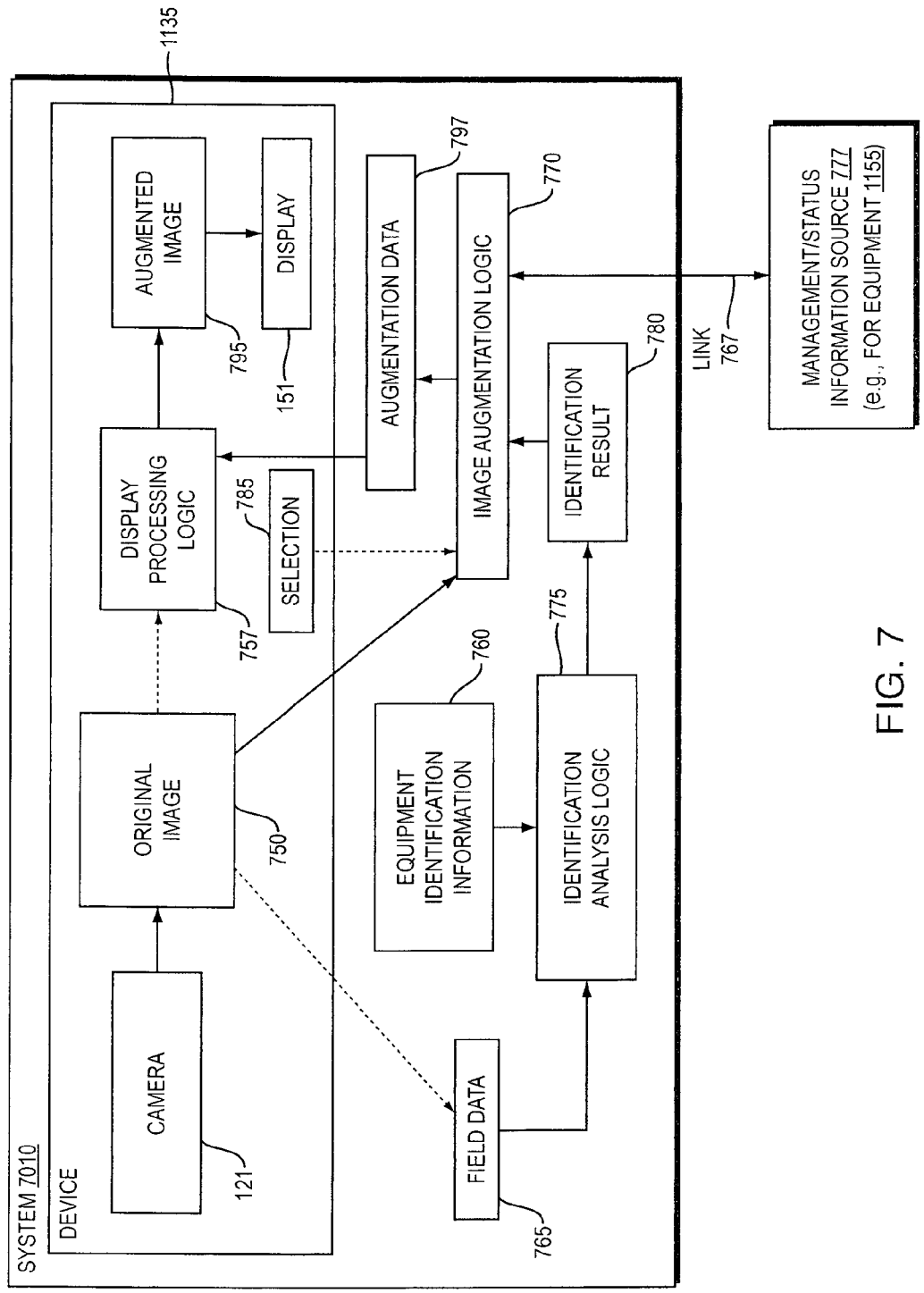

FIG. 7 illustrates an example implementation of an augmented reality system 7010, using device 1135, in accordance with the technique. Camera 121 produces original image 750 of at least a portion of equipment 1155 (e.g., image 600-1 of FIG. 4) from which is derived augmented image 795 (e.g., image 611-1 of FIG. 4) for display on display 151 and/or touchpad 135. Field data 765 is data that may be used to help identify equipment 1155, which data may be, include, or be included in information supplied by device 1135, such as image 750. For example, field data 765 may be or include an image supplied by device 1135 of at least a portion of equipment 1155, position information supplied by device 1135, e.g., based on its module 115, indicating a GPS-based or other location for device 1135, device 1135 orientation information supplied by device 1135, e.g., based on its sensing unit 140, indicating a direction in which camera 121 was pointed for image 750, and/or short range communication based information supplied by device 1135, e.g., based on its module 114, indicating that device 1135 is receiving RFID or Bluetooth or other signals from equipment 1155. Field data 765 may include information based on other components of device 1135.

Based on field data 765 and equipment identification information 760, identification analysis logic 775 produces an identification result 780, which may identify equipment 1155. For example, if field data 765 includes image 750 of equipment 1155 and information 760 includes a database of images of equipment, logic 775 may use pattern matching processes to match up image 750 with another image in the database and thereby to help produce result 780. In another example, if field data 765 includes GPS position information and information 760 includes a table of GPS locations for equipment, logic 775 may execute a look up process using the GPS position information and the table, to help produce result 780.

Based on image 750, identification result 780, and possibly a user selection 785, image augmentation logic 770 produces augmentation data 797 for use in producing image 795. For example, with reference also to FIG. 4, if result 780 indicates that equipment 1155 in image 750 is model number ZZ and serial number YY, logic 770 may query management/status information source 777 (described below) over link 767 (described below) for utilization information for model number ZZ and serial number YY, and may produce data 797 that includes pie chart 613. In another example, with reference also to FIG. 5, if result 780 indicates that equipment 1155 in image 750 is model number ZZ and serial number YY, and the user entered a selection 785 as shown in FIG. 5C, logic 770 may produce data 797 that includes model number ZZ and serial number YY for inclusion in image 795 as shown in image 611-22. Depending on the implementation, data 797 may include only information to be added to image 750 or may also include at least some other information needed to produce image 795, including information from image 750.

Based on data 797 and possibly image 750, display processing logic 757 produces image 795 for display on display 151 and/or touchpad 135. Logic 757 may be, include, or be included in controller 180 and/or output unit 150. For example, with reference also to FIG. 4, if data 797 includes data describing pie chart 613, logic 757 synthesizes image 795 from image 750 and data 797.

Depending on the implementation, all or a portion of system 7010 may be included in device 1135. For example, device 1135 may include logic 775 and information 760 so that device 1135 can produce result 780 on its own. In such an example, logic 770 may be implemented in an online server, so that device 1135 can submit result 780 to the online server and receive a response that includes data 797.

Link 767 enables communications between logic 770 and source 777. Link 767 may be a Fibre Channel network, which may use encapsulated SCSI protocols. Link 767 may alternatively be one or more TCP/IP lines, which may use a known protocol such as NFS, HTTP, and Windows Networking. Link 767 may alternatively be a WIFI or WAN or other wireless connection, or as simple as a dedicated physical connection such as a USB or serial connection.

Source 777 may be, include, or be included in a management system for equipment 1155, such as the Navisphere storage management software available with EMC's Clariion data storage system, or the Unisphere storage management software available with EMC's VNX data storage system. Source 777 may support one or more interfaces such as an application programming interface (API), command line interface (CLI), graphical user interface (GUI), or web services.

To gain management/status information about equipment 1155, logic 770 sends management I/O requests (queries) to source 777. The management I/O requests may take the form of command line interface (CLI) I/O requests or graphical user interface (GUI) I/O requests. An exemplary management I/O request is a request for the state of a component of equipment 1155.

Source 777 may monitor attributes of elements in the equipment 1155 environment and store such meta-data in equipment 1155. The relevant attributes may include the configuration and/or state of monitored elements. Monitored elements may include, for example, storage processors, disk array enclosures, nondisruptive upgrade (NDU), each storage element, each virtual volume, and each virtual frame. This meta-data may be collected in various ways based on various triggers. For example, this meta-data may be collected by polling the monitored elements. A timer may trigger a poll every minute. Polls may, additionally or alternatively, be triggered by events such as management I/O requests.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in using augmented reality in data storage management, the method comprising:
   receiving, by a camera of a mobile device, an original image of a data storage system comprising multiple data storage devices, wherein the original image is received by pointing the mobile device at the data storage system to capture the original image;
   based on the original image, automatically identifying the data storage system, wherein the identification is based on an identifier identifying feature associated with the data storage system;
   based on the identification, automatically retrieving information about the data storage system, wherein the information relates to the data storage system and at least one of IOPs, CPU utilization, capacity, a pie chart breaking down storage utilization by application, or the flow of data from a host to the data storage system;
   deriving a first augmented reality image from the original image and the information;
   detecting a change of focus of the camera with respect to the original image upon the camera focusing on one or more of the data storage devices; and
   in response to detecting the change of focus, deriving a second augmented reality image comprising additional information in connection with the one or more data storage devices.

2. The method of claim 1, wherein the augmented reality image is based on pointing a smartphone with the camera at the data storage system.

3. The method of claim 1, wherein the augmented reality image is based on shape information of characteristic external shapes of the data storage system.

4. The method of claim 1, wherein the augmented reality image is based on the product name of the data storage system.

5. The method of claim 1, wherein the augmented reality image is based on a mechanism used for identifying the data storage system.

6. The method of claim 1, wherein the augmented reality image is based on device orientation information for the mobile device supplying the original image.

7. A system for use in using augmented reality in data storage management, the system comprising:
   first logic receiving, by a camera of a mobile device, an original image of a data storage system comprising multiple data storage devices, wherein the original image is received by pointing the mobile device at the data storage system to capture the original image;
   second logic automatically identifying the data storage system, wherein the identification is based on an identifying feature associated with the data storage system;
   third logic automatically retrieving information about the data storage system, wherein the information relates to the data storage system and at least one of IOPs, CPU utilization, capacity, a pie chart breaking down storage utilization by application, or the flow of data from a host to the data storage system;
   fourth logic deriving a first augmented reality image from the original image and the information;
   fifth logic detecting a change of focus of the camera with respect to the original image upon the camera focusing on one or more of the data storage devices; and
   in response to detecting the change of focus, sixth logic deriving a second augmented reality image comprising additional information in connection with the one or more data storage devices.

8. The system of claim 7, wherein the augmented reality image is based on pointing a smartphone with the camera at the data storage system.

9. The system of claim 7, wherein the augmented reality image is based on shape information of characteristic external shapes of the data storage system.

10. The system of claim 7, wherein the augmented reality image is based on the product name of the data storage system.

11. The system of claim 7, wherein the augmented reality image is based on a mechanism used for identifying the data storage system.

12. The system of claim 7, wherein the augmented reality image is based on device orientation information for the mobile device supplying the original image.

* * * * *